US010536067B2

(12) United States Patent
Murase et al.

(10) Patent No.: US 10,536,067 B2
(45) Date of Patent: Jan. 14, 2020

(54) ROTARY MACHINE

(71) Applicants: KAWASAKI JUKOGYO KABUSHIKI KAISHA, Kobe-shi, Hyogo (JP); NATIONAL UNIVERSITY CORPORATION TOKYO UNIVERSITY OF MARINE SCIENCE AND TECHNOLOGY, Tokyo (JP)

(72) Inventors: Yohei Murase, Kobe (JP); Etsuya Yanase, Kobe (JP); Toshiyuki Yanamoto, Kobe (JP); Mitsuru Izumi, Tokyo (JP); Motohiro Miki, Tokyo (JP); Kota Yamaguchi, Tokyo (JP)

(73) Assignees: KAWASAKI JUKOGYO KABUSHIKI KAISHA, Kobe (JP); NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 81 days.

(21) Appl. No.: 15/757,593

(22) PCT Filed: Aug. 2, 2016

(86) PCT No.: PCT/JP2016/003564
§ 371 (c)(1),
(2) Date: Mar. 5, 2018

(87) PCT Pub. No.: WO2017/038003
PCT Pub. Date: Mar. 9, 2017

(65) Prior Publication Data
US 2018/0248464 A1    Aug. 30, 2018

(30) Foreign Application Priority Data
Sep. 2, 2015    (JP) .................................. 2015-172527

(51) Int. Cl.
*H02K 9/20*    (2006.01)
*H02K 55/02*    (2006.01)
(Continued)

(52) U.S. Cl.
CPC .............. *H02K 55/02* (2013.01); *F28D 15/02* (2013.01); *F28D 15/025* (2013.01);
(Continued)

(58) Field of Classification Search
CPC ............ H02K 55/02; H02K 9/20; H02K 9/19; H02K 1/32; H02K 55/04; F28D 15/02;
(Continued)

(56) References Cited

U.S. PATENT DOCUMENTS

2007/0095075 A1*  5/2007  Frank .................. F28D 15/0266
                                                      62/48.2
2014/0378310 A1* 12/2014  Kwon ..................... H02K 55/04
                                                      505/163

FOREIGN PATENT DOCUMENTS

CA    2429283 A1    5/2002
DE    36 13 039 A1   9/1987
(Continued)

OTHER PUBLICATIONS

Oct. 4, 2016 Serach Report issued in International Patent Application No. PCT/JP2016/003564.
(Continued)

*Primary Examiner* — Naishadh N Desai
(74) *Attorney, Agent, or Firm* — Oliff PLC

(57) ABSTRACT

A rotary machine cools a cooling target inside a rotor rotatable around a rotational axis, includes a condenser section disposed outside the rotor and condenses a gas phase cooling medium into a liquid phase cooling medium; an evaporator section disposed inside the rotor, and evaporates the liquid phase cooling medium generated by condensation
(Continued)

in the condenser section into the gas phase cooling medium, by heat exchange between the cooling target and the liquid phase cooling medium; and a coupling pipe flows the liquid phase cooling medium and the gas phase cooling medium between the evaporator section and the condenser section, wherein the coupling pipe has a pipe structure in which a liquid phase cooling medium passage flows the liquid phase cooling medium generated by the condensation in the condenser section and a gas phase cooling medium passage flows the gas phase cooling medium generated by evaporation in the evaporator section.

9 Claims, 5 Drawing Sheets

(51) Int. Cl.
    *H02K 9/19*     (2006.01)
    *F28D 15/02*     (2006.01)
    *H02K 1/32*     (2006.01)
    *H02K 55/04*     (2006.01)

(52) U.S. Cl.
    CPC ........... *F28D 15/0275* (2013.01); *H02K 1/32* (2013.01); *H02K 9/19* (2013.01); *H02K 9/20* (2013.01); *H02K 55/04* (2013.01); *Y02E 40/622* (2013.01)

(58) Field of Classification Search
    CPC ... F28D 15/0275; F28D 15/025; Y02E 40/622
    See application file for complete search history.

(56) References Cited

FOREIGN PATENT DOCUMENTS

| | | | |
|---|---|---|---|
| DE | 10 2011 004 952 A1 | | 9/2012 |
| JP | 55065890 A | * | 5/1980 |
| JP | S55-065890 A | | 5/1980 |
| JP | 3799016 B2 | | 7/2006 |

OTHER PUBLICATIONS

Mar. 21, 2019 Extended Search Report issued in European Patent Application No. 16841045.4.

* cited by examiner

ROTARY MACHINE

TECHNICAL FIELD

The present invention relates to a rotary machine which cools a cooling target (target to be cooled) inside a rotor which is rotatable around a rotational axis, by a thermosiphon action.

BACKGROUND ART

In recent years, a high-temperature superconducting (HTS) magnet around which HTS wires are wound have a broader range of applications. For example, rotary machines such as a superconducting rotary machine using this HTS magnet have been developed.

By the way, the critical temperatures of HTS materials are about 90K. For this reason, it is necessary to cool windings of the HTS wires to about several K to several tens K by use of a cooling device or the like. In particular, in a superconducting rotary machine for a marine vessel (ship), a great thermal load is generated. To secure a sufficient cooling capability, for example, a cooling device such as a GM freezing (refrigerating) device is used. In a case where the superconducting rotary machine for the marine vessel which uses the HTS material employs a rotation field type (revolving field type) in which field elements including HTS field poles rotate, a direct cooling method cannot be used, in which the cooling device is directly connected to the HTS magnet and the field poles are cooled by conductive heat transfer. Therefore, the cooling device and the rotor are thermally connected to each other by utilizing a cooling medium (refrigerant) reflux. Such a method is implemented by, for example, a thermosiphon cooling system which cools the HTS field poles by natural convection by use of a cooling medium (e.g., neon, nitrogen or the like) having been cooled by the cooling device such as the GM freezing device. For example, Patent Literature 1 discloses a superconducting machine as the superconducting rotary machine using the thermosiphon cooling system.

CITATION LIST

Patent Literature

Patent Literature 1: Japanese Patent No. 3799016 Publication

SUMMARY OF INVENTION

Technical Problem

However, if the conventional superconducting machine disclosed in the above-described Patent Literature 1 is used in the marine vessel, or the like, the whole of the superconducting machine may be tilted (inclined) or shakes in some cases. In a case where the whole of the conventional superconducting machine is tilted or shakes, the capability of thermal transport between a condenser section provided on the cooling device side (closer to the cooling device) and an evaporator section provided inside the rotor is degraded.

This problem will be described more specifically. In the case of the configuration of the superconducting machine disclosed in Patent Literature 1, if the whole of the machine is tilted or shakes, a bent portion of a heat pipe provided between the condenser section (condenser unit) and the evaporator section inside the rotor is clogged with a liquid phase cooling medium, and a flow of a gas phase cooling medium is impeded. For this reason, in the superconducting machine disclosed in Patent Literature 1, if the whole of the machine is tilted or shakes, continuous and stable supply of the cooling medium (gas, liquid) is impeded, and the thermal transport capability is degraded, in some cases.

The present invention has been made in view of the above-described problem, and an object of the present invention is to provide a rotary machine which is capable of stably maintaining the capability of thermal transport between a condenser section and an evaporator section, even in a case where the whole of the rotary machine is tilted or shakes.

Solution to Problem

According to an aspect of the present invention, a rotary machine which cools a cooling target inside a rotor which is rotatable around a rotational axis, by a thermosiphon action, comprises a condenser section which is disposed outside the rotor and condenses a gas phase cooling medium into a liquid phase cooling medium; an evaporator section which is disposed inside the rotor, and evaporates the liquid phase cooling medium generated by condensation in the condenser section into the gas phase cooling medium, by heat exchange between the cooling target and the liquid phase cooling medium; and a coupling pipe which flows therethrough the liquid phase cooling medium and the gas phase cooling medium between the evaporator section and the condenser section, and has a bent portion, wherein the coupling pipe has a pipe structure in which a liquid phase cooling medium passage which flows therethrough the liquid phase cooling medium generated by the condensation in the condenser section and a gas phase cooling medium passage which flows therethrough the gas phase cooling medium generated by evaporation in the evaporator section are separately provided.

In accordance with this configuration, in the coupling pipe, the liquid phase cooling medium passage and the gas phase cooling medium passage are separately provided. In this structure of the coupling pipe, it becomes possible to prevent a situation in which the bent portion of the coupling pipe is clogged with the liquid phase cooling medium and thereby a flow of the gas phase cooling medium is impeded, in a case where the whole of the rotary machine is tilted or shakes.

Therefore, the rotary machine according to an aspect of the present invention can obtain an advantage in that the capability of thermal transport between the condenser section and the evaporator section can be stably maintained, even in a case where the whole of the rotary machine is tilted or shakes.

In the rotary machine according to an aspect of the present invention, having the above-described configuration, the coupling pipe may have a shape in which a first end portion of the coupling pipe is inserted into the evaporator section, the coupling pipe extends from the evaporator section or a cooling medium flow section toward an outside region of the rotor along the rotational axis, the coupling pipe is bent at the bent portion, and a second end portion of the coupling pipe is secured to the condenser section, and the coupling pipe may have a dimension set so that an angle formed between the rotational axis and a line segment connecting the first end portion and the second end portion to each other is equal to or larger than an allowable tilt angle $\theta$ indicating an angle to which the rotary machine is allowed to be tilted.

For example, in a case where the whole of the rotary machine is tilted, the coupling pipe is tilted correspondingly, and the first end portion of the coupling pipe which is closer to the evaporator section sometimes becomes higher than the bent portion, in a region between the evaporator section and the bent portion. In this case, the liquid phase cooling medium does not flow through the coupling pipe, from the bent portion toward the evaporator section.

However, in the above-described configuration, in the rotary machine according to the present invention, the coupling pipe has a dimension set so that the angle formed between the rotational axis and the line segment connecting the first end portion and the second end portion of the coupling pipe to each other is equal to or larger than the allowable tilt angle θ. Therefore, even when the whole of the rotary machine is tilted to the allowable tilt angle θ, the second end portion of the coupling pipe which is closer to the condenser section can be kept at a level that is equal to or higher than the level of the first end portion of the coupling pipe which is closer to the evaporator section.

For example, in a case where the whole of the rotary machine is tilted or shakes and the liquid phase cooling medium is not supplied to the evaporator section for some time through the coupling pipe, the liquid phase cooling medium can be pushed into the evaporator section due to a head pressure (hydraulic head pressure) in a state in which the liquid phase cooling medium is reserved in the coupling pipe at a level that is equal to or higher than the level of the first end portion of the coupling pipe which is closer to the evaporator section. Therefore, even in a case where the whole of the rotary machine is tilted or shakes, the liquid phase cooling medium can be supplied to the evaporator section. In this way, the capability of cooling the cooling target inside the rotor can be maintained.

In the rotary machine according to an aspect of the present invention, having the above-described configuration, the coupling pipe may have a double pipe structure in which an inner pipe is the gas phase cooling medium passage, and a space formed between the inner pipe and an outer pipe surrounding an outer periphery of the inner pipe is the liquid phase cooling medium passage, or a parallel pipe structure in which the liquid phase cooling medium passage and the gas phase cooling medium passage are disposed in parallel, and inside the evaporator section, a first end portion of the gas phase cooling medium passage, which is closer to the evaporator section, may protrude more than a first end portion of the liquid phase cooling medium passage which is closer to the evaporator section.

In accordance with this configuration, inside the evaporator section, the first end portion of the gas phase cooling medium passage, which is closer to the evaporator section, protrudes more than the first end portion of the liquid phase cooling medium passage which is closer to the evaporator section. In this structure, for example, even in a case where the whole of the rotary machine is tilted or shakes, it becomes possible to prevent a situation in which the liquid phase cooling medium supplied to the evaporator section through the liquid phase cooling medium passage flows into the gas phase cooling medium passage.

The rotary machine according to an aspect of the present invention, having the above-described configuration, may comprise an ingress prevention section which is provided inside the condenser section and prevents ingress of the liquid phase cooling medium into gas phase cooling medium passage.

In accordance with this configuration, the ingress prevention section can prevent ingress of the liquid phase cooling medium into the gas phase cooling medium passage, inside the condenser section. This makes it possible to prevent a situation in which the gas phase cooling medium passage is clogged with the liquid phase cooling medium.

For example, the ingress prevention section can be implemented by a blocking member which prevents a situation in which droplets of the liquid phase cooling medium falling downward enters the gas phase cooling medium passage, inside the condenser section. Or, for example, the shape of the end portion of the gas phase cooling medium passage, which is closer to the condenser section, may be bent to prevent the ingress of the liquid phase cooling medium into the gas phase cooling medium passage, and this portion with the changed shape may be used as the ingress prevention section.

In the rotary machine according to an aspect of the present invention, having the above-described configuration, a second end portion of the coupling pipe may be secured to the condenser section, a first end portion of the coupling pipe may be inserted into the evaporator section, the evaporator section may have an opening through which the coupling pipe is inserted into the evaporator section, and the rotary machine may comprise a support section which is provided to close a gap formed between an outer peripheral surface of the coupling pipe and a periphery of the opening and supports the coupling pipe at a location which is in the vicinity of the opening.

In accordance with this configuration, by providing the support section, the coupling pipe can be supported at both ends thereof by the condenser section and the support section. This structure can improve resistances to an impact and fatigue generated when the whole of the rotary machine is tilted or shakes. In addition, the support section can prevent the ingress of the liquid phase cooling medium into the gap formed between the periphery of the opening and the coupling pipe.

In the rotary machine according to an aspect of the present invention, having the above-described configuration, the evaporator section may have an opening through which the coupling pipe is inserted into the evaporator section, and the rotary machine may comprise: a back flow prevention section which is included in the coupling pipe and prevents the liquid phase cooling medium from flowing back from an inside of the evaporator section into a gap formed between an outer peripheral surface of the coupling pipe and a periphery of the opening.

In accordance with this configuration, by providing the back flow prevention section, it becomes possible to prevent a situation in which the liquid phase cooling medium flows back from the inside of the evaporator section into the gap formed between the outer peripheral surface of the coupling pipe and the periphery of the opening, in a case where the whole of the rotary machine is tilted or shakes.

For example, the back flow prevention section may be implemented by a blocking member provided on the outer periphery of the coupling pipe to prevent a situation in which the liquid phase cooling medium flows back from the inside of the evaporator section, in a case where the whole of the rotary machine is tilted or shakes.

In the rotary machine according to an aspect of the present invention, having the above-described configuration, the evaporator section may have an opening through which the coupling pipe is inserted into the evaporator section, and the rotary machine may comprise: a seal section which prevents the liquid phase cooling medium from flowing back from an inside of the evaporator section into a gap formed between an outer peripheral surface of a portion of the coupling pipe which is closer to the evaporator section and a periphery of the opening.

In accordance with this configuration, by providing the seal section, it becomes possible to prevent a situation in which the liquid phase cooling medium flows back from the inside of the evaporator section into the gap formed between the outer peripheral surface of the coupling pipe and the periphery of the opening, in a case where the whole of the rotary machine is tilted or shakes.

In the rotary machine according to an aspect of the present invention, having the above-described configuration, the evaporator section may include: a cooling medium reservoir section which reserves the liquid phase cooling medium therein; and an opening through which the coupling pipe is inserted into the cooling medium reservoir section, at least a portion of an inner surface of a wall surface of the cooling medium reservoir section, the wall surface being located on a side where the coupling pipe is inserted into the cooling medium reservoir section, may be provided with a tapered hood portion formed to be tilted with respect to the rotational axis, and the tapered hood portion has the opening in a tip end portion thereof, and a tilt angle of the tapered hood portion with respect to the rotational axis may be larger than the allowable tilt angle θ.

In accordance with the above-described configuration, the tilt angle of the tapered hood portion with respect to the rotational axis is larger than the allowable tilt angle θ. Therefore, for example, in a case where the rotary machine is tilted to the allowable tilt angle θ and thereby the position of the first end portion of the coupling pipe which is closer to the evaporator section becomes higher than that of the bent portion, tilt of the tapered hood portion can be maintained so that the tapered hood portion becomes lower from the opening toward the inside of the cooling medium reservoir section. Therefore, the liquid phase cooling medium having flowed through the coupling pipe can flow into the cooling medium reservoir section. In addition, it becomes possible to prevent a situation in which the liquid phase cooling medium reserved in the cooling medium reservoir section flows back toward the coupling pipe.

The above and further objects, features and advantages of the present invention will more fully be apparent from the following detailed description of preferred embodiment with reference to the accompanying drawings.

Advantageous Effects of Invention

The present invention has been configured as described above, and can obtain advantages in that the capability of thermal transport between a condenser section and an evaporator section can be stably maintained, even in a case where the whole of a rotary machine is tilted or shakes.

DESCRIPTION OF EMBODIMENTS

Outline of the Present Invention

The present inventors intensively studied the configuration of a rotary machine which cools a cooling target (target to be cooled) such as field poles or armatures inside a rotor, by a thermosiphon action. In particular, the present inventors studied a case where this rotary machine is disposed in a place, for example, inside a marine vessel (ship) where the rotary machine tends to be tilted or shake and cannot be maintained in a horizontal state. In some cases, the thermosiphon action is referred to as a heat pipe action. Specifically, it was found that the problem occurs in the superconducting machine (hereinafter this will be referred to as a conventional rotary machine) disclosed in Patent Literature 1.

In the conventional rotary machine, a cooling medium (liquid phase cooling medium) generated by liquefaction in a condenser cooled by a cooling device is delivered to a center hollow space (evaporator section) formed inside a rotor of the rotary machine through a coupling pipe, the evaporator section evaporates the liquid phase cooling medium, and thus windings (field poles) wound around a winding holder provided to surround the evaporator section are cooled via the winding holder. In the conventional rotary machine, a gas phase cooling medium generated by evaporation of the liquid phase cooling medium in the evaporator section is returned to the condenser through the same coupling pipe.

Figure 5A:
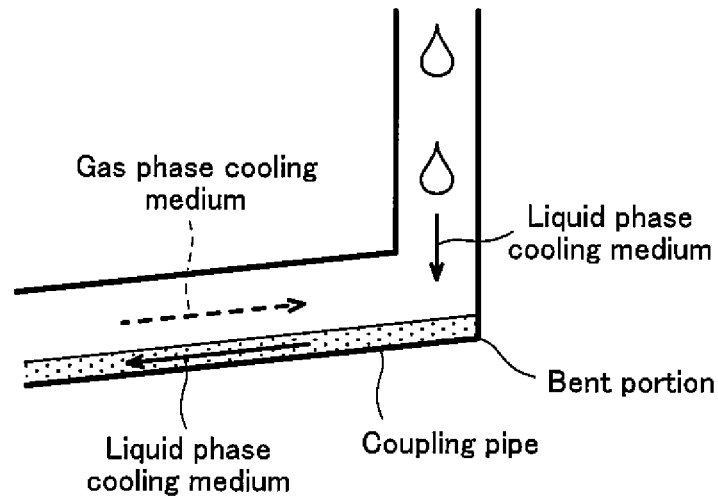
FIG. 5A is a schematic view showing a flow state of a cooling medium (refrigerant) inside the coupling pipe, and showing a state inside the coupling pipe in a case where a conventional rotary machine is placed on a horizontal floor surface.

Here, it is assumed that the conventional rotary machine is placed on a horizontal floor surface. As shown in FIG. 5A, in the coupling pipe included in this rotary machine, droplets of the liquid phase cooling medium generated by condensation in the condenser section fall downward through the inside of a coupling pipe portion extending substantially in a vertical direction, and move toward the evaporator section along the bottom portion of a coupling pipe portion extending substantially in a horizontal direction. The gas phase cooling medium generated in the evaporator section flows in a direction opposite to the direction in which the liquid phase cooling medium flows, from the evaporator section toward the condenser section, through the inside of the coupling pipe, due to a pressure difference or a density difference between the evaporator section and the condenser section.

Figure 5B:
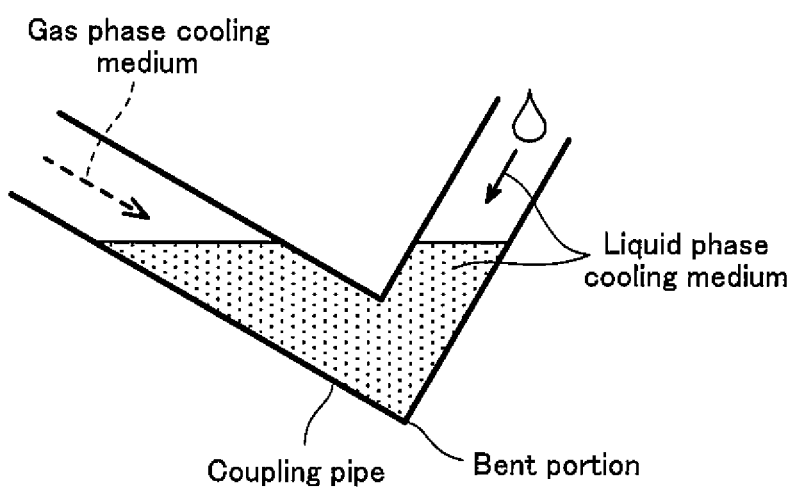
FIG. 5B is a schematic view showing the flow state of the cooling medium inside the coupling pipe, and showing a state inside the coupling pipe in a case where the conventional rotary machine is tilted or shakes.

If the conventional rotary machine is tilted or shakes, for example, as shown in FIG. 5B, the liquid phase cooling medium is likely to be stagnant in the bent portion which is a coupling portion of the coupling pipe portion extending substantially in the vertical direction and the coupling pipe portion extending substantially in the horizontal direction, or a region which is in the vicinity of the bent portion. In a state in which the liquid phase cooling medium is stagnant in the bent portion of the coupling pipe and the region which is in the vicinity of the bent portion, the coupling pipe is clogged with this liquid phase cooling medium, and the flow of the gas phase cooling medium is impeded.

If the flow of the gas phase cooling medium is impeded, continuous and stable supply of the cooling medium between the condenser section and the evaporator section is impeded, and the capability of thermal transport between the condenser section and the evaporator section is degraded. Due to the degradation of the thermal transport capability, the rotor cannot be stably rotated. The present inventors studied in repetition this problem, and discovered the following.

Specifically, the present inventors discovered that a passage which flows the gas phase cooling medium therethrough can be secured even in a case where the rotary machine is tilted or shakes, by forming a pipe structure in which a liquid phase cooling medium passage which flows the liquid phase cooling medium therethrough and a gas phase cooling medium passage which flows the gas phase cooling medium therethrough are separately provided. With this pipe structure, the capability of thermal transport between the condenser section and the evaporator section can be stably maintained, even in a case where the whole of the rotary machine is tilted or shakes.

Hereinafter, the embodiment of the present invention will be described with reference to the drawings. Throughout the drawings, the same or corresponding constituents are designated by the same reference symbols and will not be described in repetition.

Configuration of Rotary Machine

Figure 1:
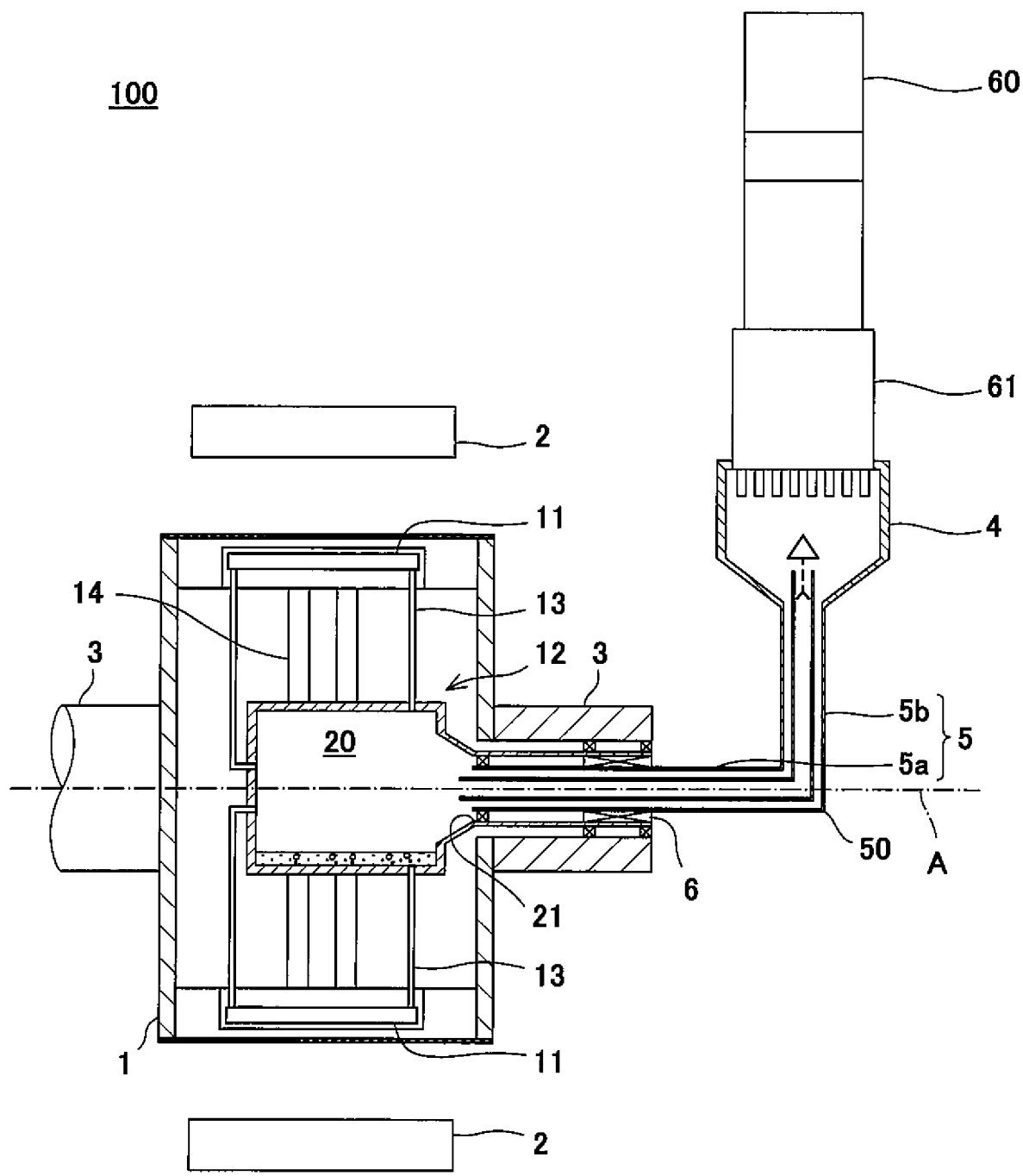
FIG. 1 is a schematic end view showing the exemplary configuration of a rotary machine according to an embodiment of the present invention.

Hereinafter, the configuration of a rotary machine 100 according to the present embodiment will be described with reference to FIG. 1. FIG. 1 is a schematic end view showing the exemplary configuration of the rotary machine 100 according to an embodiment of the present invention. Although in the present embodiment, a superconducting rotary machine will be exemplarily described as the rotary machine 100, the rotary machine 100 is not limited to this so long as the rotary machine 100 is a rotary machine which cools a cooling target (target to be cooled) inside a rotor 1 which is rotatable around a rotational axis A, by a thermosiphon action. Although in the present embodiment, superconducting coils 11 are exemplarily described as the cooling target, the cooling target is not limited to this, and may be, for example, a permanent magnet, normal conduction coils, or the like. Further, the cooling target is not limited to field poles and may be, for example, armatures or the like.

As shown in FIG. 1, the rotary machine 100 includes a stator including a plurality of armatures 2, the rotor 1, a condenser section 4, and a coupling pipe 5. A rotary shaft 3 of the rotor 1 is supported by a bearing which is not shown in such a manner that the rotor 1 is rotatable around a rotational axis A extending in a horizontal direction. The bearing may be a mechanical bearing or a magnetic bearing. The plurality of armatures 2 are provided on the outer periphery of the rotor 1. A cooling device 60 for cooling the superconducting coils (field poles) 11 included in the rotor 1 is secured outside the rotor 1, to keep the superconducting coils 11 in a superconducting state. The condenser section 4 is disposed at the end portion of a cold head 61. The cooling device 60 is thermally connected to the superconducting coils 11 of the rotor 1 via the coupling pipe 5 secured to the condenser section 4.

In the condenser section 4, the gas phase cooling medium is cooled by the cold head 61 to a predetermined temperature, and condensed into the liquid phase cooling medium. Droplets of the liquid phase cooling medium fall downward from the condenser section 4 through a coupling pipe portion (second coupling pipe portion 5b) extending substantially in a vertical direction. The droplets of the liquid phase cooling medium move through a coupling pipe portion (first coupling pipe portion 5a) extending in a direction of the rotational axis A (rotational axis A direction), from a bent portion 50 toward the rotor 1.

As shown in FIG. 1, the rotor 1 includes in an inside thereof, the plurality of superconducting coils 11, and an evaporator section 12. The evaporator section 12 is configured to evaporate the liquid phase cooling medium supplied from the condenser section 4 into the gas phase cooling medium, by heat exchange between the liquid phase cooling medium and the superconducting coils 11. The evaporator section 12 includes a cooling medium reservoir section 20, an opening 21, cooling medium flow pipes 13, and heat transfer bars 14.

The cooling medium reservoir section 20 is formed in a substantially center portion inside the rotor 1. The cooling medium reservoir section 20 is a space used to reserve therein the liquid phase cooling medium supplied from the condenser section 4 through the coupling pipe 5. The opening 21 is formed in the wall surface of the cooling medium reservoir section 20 at a location that is on a side where the coupling pipe 5 is disposed. The coupling pipe 5 is inserted into the cooling medium reservoir section 20 through the opening 21.

Each of the cooling medium flow pipes 13 is an annular pipe. Specifically, the cooling medium flow pipe 13 extends from the cooling medium reservoir section 20 to a region which is in the vicinity of the superconducting coil 11 and then extends from the region which is in the vicinity of the superconducting coil 11 to the cooling medium reservoir section 20. The cooling medium flow pipe 13 is connected to the inside of the cooling medium reservoir section 20. Heat exchange between the liquid phase cooling medium having flowed through the cooling medium flow pipe 13 and the superconducting coil 11 occurs.

The heat transfer bars 14 are provided between the outer periphery of the cooling medium reservoir section 20 and the superconducting coils 11 and connected to them. The heat transfer bars 14 cool the superconducting coils 11 by heat conduction (transfer). The heat exchange between the liquid phase cooling medium and the superconducting coils 11 occurs via the cooling medium flow pipes 13 and the heat transfer bars 14, to cool the superconducting coils 11 to a predetermined temperature. In contrast, the liquid phase cooling medium is evaporated into the gas phase cooling medium by this heat exchange. The gas phase cooling medium is returned from the cooling medium reservoir section 20 to the condenser section 4 through the coupling pipe 5.

As shown in FIG. 1, the rotary shaft 3 protrudes on a side where the coupling pipe 5 is inserted and has a hollow space. The coupling pipe 5 is disposed inside the hollow rotary shaft 3. A first end portion of the coupling pipe 5 is inserted into the cooling medium reservoir section 20. Inside the rotary shaft 3 protruding on a side where the coupling pipe 5 is inserted, a magnetic fluid sealing member 6 is provided between the inner peripheral surface of the rotary shaft 3 and the coupling pipe 5 to seal a gap formed between the inner peripheral surface of the rotary shaft 3 and the coupling pipe 5. By this sealing, cooling medium ambience and atmospheric air are isolated from each other. Although in the rotary machine 100 according to the present embodiment, the magnetic fluid sealing member 6 is used for the sealing as described above, a labyrinth seal may be used instead of the magnetic fluid sealing member 6.

Although in the example of FIG. 1, the evaporator section 12 includes the cooling medium reservoir section 20 formed in the substantially center portion inside the rotor 1, and used to reserve the liquid phase cooling medium, the configuration of the evaporator section 12 is not limited to this. For example, the evaporator section 12 may not include the cooling medium reservoir section 20, and may be configured to flow to the cooling medium flow pipes 13 the liquid phase cooling medium having flowed from the condenser section 4 through the coupling pipe 5, without reserving the liquid phase cooling medium in the cooling medium reservoir section 20, and configured to exchange heat between the superconducting coils 11 and the liquid phase cooling medium having flowed through the cooling medium flow pipes 13. In this configuration, the coupling pipe 5 is inserted into the openings of the cooling medium flow pipes 13, and the cooling medium flow pipes 13 directly communicate with the coupling pipe 5.

The rotor 1 according to the present embodiment is configured to cool the superconducting coils 11 by utilizing a thermosiphon action. Hereinafter, the configuration for realizing the thermosiphon action in the rotor 1 will be described in detail.

Thermosiphon Action

Figure 2:
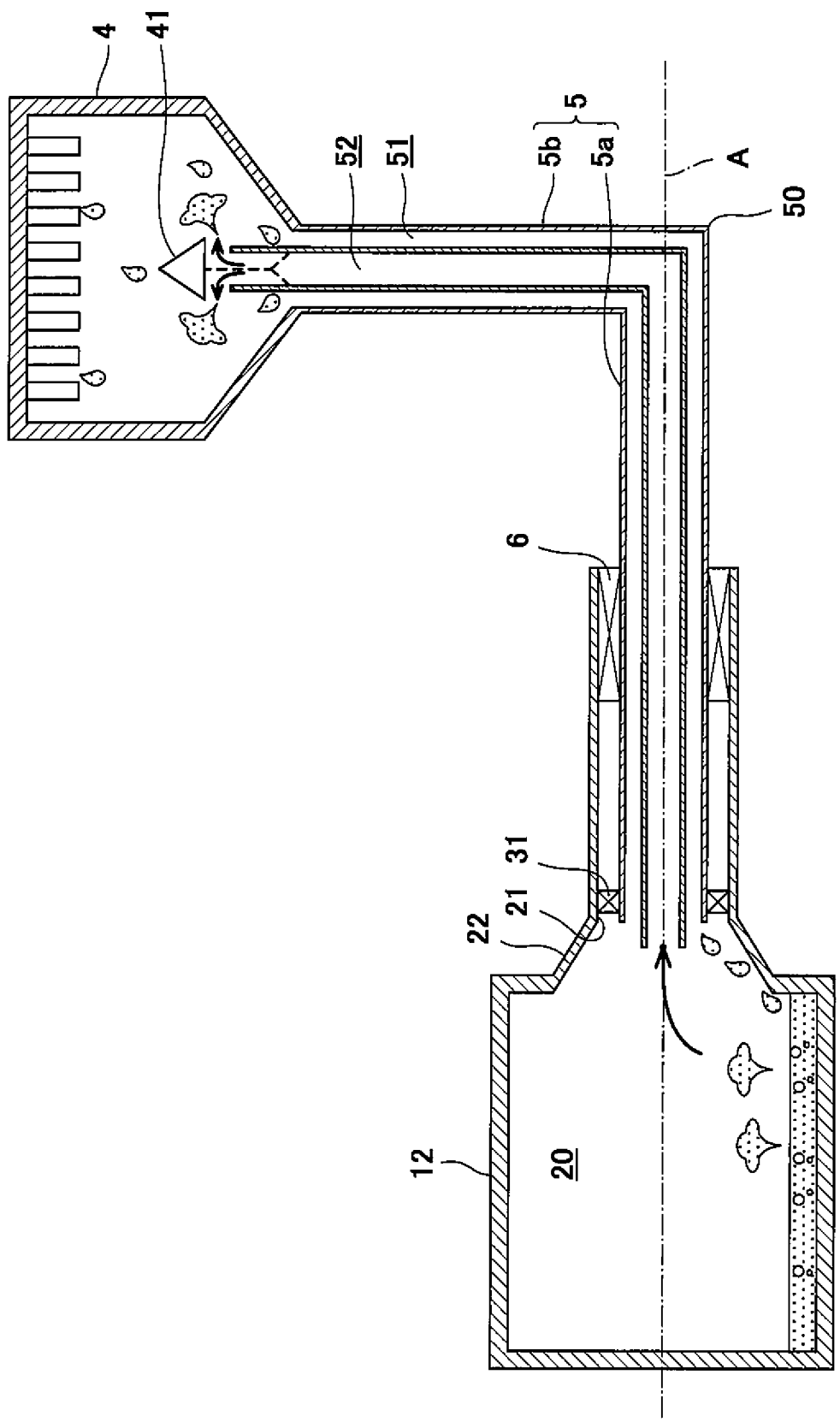
FIG. 2 is a schematic view showing an example of a thermosiphon cooling system used in the rotary machine of FIG. 1.

Hereinafter, the configuration (thermosiphon cooling system) for realizing the thermosiphon action in the rotary machine 100 according to the present embodiment will be described with reference to FIGS. 1 and 2. FIG. 2 is a schematic view showing an example of the thermosiphon cooling system used in the rotary machine 100 of FIG. 1.

The thermosiphon cooling system includes the cooling device 60, the condenser section 4, the evaporator section 12, and the coupling pipe 5. The thermosiphon cooling system is configured to fill the cooling medium (e.g., neon, nitrogen or the like) inside a sealed space including the condenser section 4, the evaporator section 12, and the coupling pipe 5. As shown in FIG. 2, phase change of the cooling medium occurs between the condenser section 4 and the evaporator section 12. In the thermosiphon cooling system, a gravitational force is utilized to reflux the cooling medium. More specifically, the cooling medium (gas phase cooling medium) is cooled by the cooling device 60 and condensed into the liquid phase cooling medium in the condenser section 4. The liquid phase cooling medium flows through a liquid phase cooling medium passage 51 provided inside the coupling pipe 5 by the gravitational force, is reserved inside the cooling medium reservoir section 20 of the evaporator section 12, and is evaporated into the gas phase cooling medium by heat exchange with the superconducting coils 11 which are the cooling target. The gas phase cooling medium is returned from the evaporator section 12 toward the condenser section 4 through a gas phase cooling medium passage 52 provided inside the coupling pipe 5, due to a pressure difference or density difference between the condenser section 4 and the evaporator section 12. The detail of the configuration of the coupling pipe 5 will be described later.

As described above, in the rotary machine 100 according to the present embodiment, the superconducting coils 11 which are the cooling target can be cooled in such a manner that the phase of the cooling medium is changed, and the cooling medium is circulated between the condenser section 4 and the evaporator section 12 by the natural convection.

Structure of Coupling Pipe

Now, the structure of the coupling pipe 5 will be described more specifically with reference to the above-described FIGS. 1 and 2.

As shown in FIGS. 1 and 2, the first end portion of the coupling pipe 5 is inserted into the cooling medium reservoir section 20 of the evaporator section 12, and the coupling pipe 5 extends from the cooling medium reservoir section 20 toward an outside region of the rotor 1 along the rotational axis A and is bent at the bent portion 50. The coupling pipe 5 bent at the bent portion 50 extends toward the condenser section 4 located higher than at least the rotational axis A. The second end portion of the coupling pipe 5 is secured to the condenser section 4. In the description, the end portion of the coupling pipe 5 which is closer to the evaporator section 12 will be referred to as the first end portion, and the end portion of the coupling pipe 5 which is closer to the condenser section 4 will be referred to as the second end portion.

As shown in FIG. 2, the coupling pipe 5 has a pipe structure in which the liquid phase cooling medium passage 51 which flows therethrough the liquid phase cooling medium generated by condensation in the condenser section 4 and the gas phase cooling medium passage 52 which flows therethrough the gas phase cooling medium generated by evaporation in the evaporator section 12 are separately provided. In the rotary machine 100 according to the present embodiment, as shown in FIG. 2, the coupling pipe 5 has a double pipe structure including an inner pipe and an outer pipe surrounding the outer periphery of this inner pipe. In the coupling pipe 5, the inner pipe is the gas phase cooling medium passage 52, and a space formed between the inner pipe and the outer pipe is the liquid phase cooling medium passage 51. However, this configuration is merely exemplary. As the structure of the coupling pipe 5, for example, the inner pipe may be the liquid phase cooling medium passage 51, and the space formed between the inner pipe and the outer pipe may be the gas phase cooling medium passage 52. The coupling pipe 5 of FIG. 2 can be formed by combining two pipes with different diameters, extending coaxially. Further, the pipe structure of the coupling pipe 5 is not limited to the double pipe structure including the inner pipe and the outer pipe. For example, the pipe structure of the coupling pipe 5 may be a parallel pipe structure in which a separating wall is provided to extend along the extending direction of the coupling pipe 5 to divide the inner passage of a single pipe into two passages, one of the two passages is the liquid phase cooling medium passage 51, and the other of the two passages is the gas phase cooling medium passage 52.

As described above, in the coupling pipe 5, the liquid phase cooling medium passage 51 and the gas phase cooling medium passage 52 are separately provided. With this pipe structure, it becomes possible to prevent a situation in which the bent portion 50 of the coupling pipe 5 is clogged with the liquid phase cooling medium and the flow of the gas phase cooling medium is impeded, in a case where the whole of the rotary machine 100 is tilted or shakes. Thus, the rotary machine 100 can stably maintain the capability of thermal transport between the condenser section 4 and the evaporator section 12, even in a case where the whole of the rotary machine 100 is tilted or shakes.

In the rotary machine 100 according to the present embodiment, as shown in FIG. 2, the gas phase cooling medium passage 52 protrudes more toward the center of the rotor 1 than the liquid phase cooling medium passage 51, in the first end portion of the coupling pipe 5 which is inserted into the cooling medium reservoir section 20 of the evaporator section 12. For example, by use of a configuration in which the first end portion of the gas phase cooling medium passage 52 protrudes more than the first end portion of the liquid phase cooling medium passage in a case where the coupling pipe 5 has the double pipe structure of FIG. 2, and the inner pipe is the gas phase cooling medium passage 52, or a case where the coupling pipe 5 has the parallel pipe structure, it becomes possible to prevent a situation in which the liquid phase cooling medium supplied to the cooling medium reservoir section 20 through the liquid phase cooling medium passage 51 flows into the gas phase cooling medium passage 52, even in a case where the whole of the rotary machine 100 is tilted.

In the rotary machine 100 according to the present embodiment, as shown in FIG. 2, an ingress prevention section 41 is provided inside the condenser section 4 to prevent the ingress of the liquid phase cooling medium into the gas phase cooling medium passage 52. As shown in FIG. 1, the cold head 61 of the cooling device 60 is provided on the upper surface of the condenser section 4. The gas phase cooling medium is cooled by the cold head 61 and condensed into the liquid phase cooling medium, and the droplets of the liquid phase cooling medium fall downward from the upper side of the condenser section 4 toward the lower side of the condenser section 4. In the rotary machine 100 according to the present embodiment, as shown in FIG. 2, a blocking member with an umbrella (cone) shape which is capable of preventing ingress of the droplets of the liquid phase cooling medium falling downward into the gas phase cooling medium passage 52, inside the condenser section 4, is provided as the ingress prevention section 41. This ingress prevention section 41 is provided inside the condenser section 4 at a location where the ingress prevention section 41 does not impede discharge of the gas phase cooling medium from the gas phase cooling medium passage 52 and prevents the ingress of the liquid phase cooling medium into the gas phase cooling medium passage 52.

The shape of the ingress prevention section 41 is not limited to the umbrella shape of FIG. 2, and may be, for example, a plate shape so long as it can prevent ingress of the liquid phase cooling medium into the gas phase cooling medium passage 52. The ingress prevention section 41 may be supported inside the condenser section 4 by a support member (not shown) provided in the gas phase cooling medium passage 52 of the coupling pipe 5 or may be supported inside the condenser section 4 by a support member (not shown) provided inside the condenser section 4.

In the rotary machine 100 of FIG. 2, the ingress prevention section 41 is provided separately from the coupling pipe 5. Alternatively, the ingress prevention section 41 may be formed by changing the shape of the second end portion of the coupling pipe 5 so that ingress of the liquid phase cooling medium into the gas phase cooling medium passage 52 does not occur. Specifically, for example, the shape of the second end portion of the gas phase cooling medium passage 52 may be bent to prevent the ingress of the liquid phase cooling medium into the gas phase cooling medium passage 52, and this portion with the changed shape may be used as the ingress prevention section 41.

By providing the ingress prevention section 41 in the above-described manner, it becomes possible to prevent a situation in which the bent portion 50 of the gas phase cooling medium passage 52 and a region which is in the vicinity of the bent portion 50 are clogged with the liquid phase cooling medium flowing into the gas phase cooling medium passage 52.

In the rotary machine 100, the first end portion of the coupling pipe 5 is inserted into the cooling medium reservoir section 20 through the opening 21, and the second end portion of the coupling pipe 5 is secured to the condenser section 4. In this structure, a gap is formed between the outer peripheral surface of the coupling pipe 5 and the periphery of the opening 21. In the rotary machine 100 according to the present embodiment, a support section 31 is provided to close the gap formed between the outer peripheral surface of the coupling pipe 5 and the periphery of the opening 21, and supports the coupling pipe in the opening 21 and/or a region which is in the vicinity of the opening 21. As the support section 31, for example, a bearing which is rotatable relatively between the opening 21 of the evaporator section 12 provided on a rotary section side and the coupling pipe 5 provided on a stationary section side and is able to support the coupling pipe 5 by the periphery of the opening 21 may be used.

In the rotary machine 100 according to the present embodiment, by providing the support section 31 as described above, the coupling member 5 can be supported at both ends of the coupling pipe 5 by the condenser section 4 and the support section 31. This structure can improve resistances to an impact and fatigue generated when the whole of the rotary machine 100 is tilted or shakes. In addition, the support section 31 can prevent the ingress of the liquid phase cooling medium into the gap formed between the periphery of the opening 21 and the coupling pipe 5. Since the ingress of the liquid phase cooling medium into the gap formed between the periphery of the opening 21 and the coupling pipe 5 can be prevented in the above-described manner, it becomes possible to prevent a situation in which the magnetic fluid sealing member 6 is exposed to the liquid phase cooling medium.

Alternatively, a seal section may be provided instead of the above-described support section 31, to prevent the ingress of the liquid phase cooling medium into the gap formed between the opening 21 and the coupling pipe 5. As the seal section, for example, there are a mechanical seal, a lip seal, and a labyrinth seal, which are rotatable relatively between the opening of the evaporator section 12 provided on the rotary section side and the coupling pipe 5 provided on the stationary section side. Further, the support section 31 and the seal section may be combined. By combining the support section 31 and the seal section, it becomes possible to significantly reduce a risk of exposure of the magnetic fluid sealing member 6 to the liquid phase cooling medium while improving the resistances of the coupling pipe 5 to the impact and fatigue.

Figure 3:
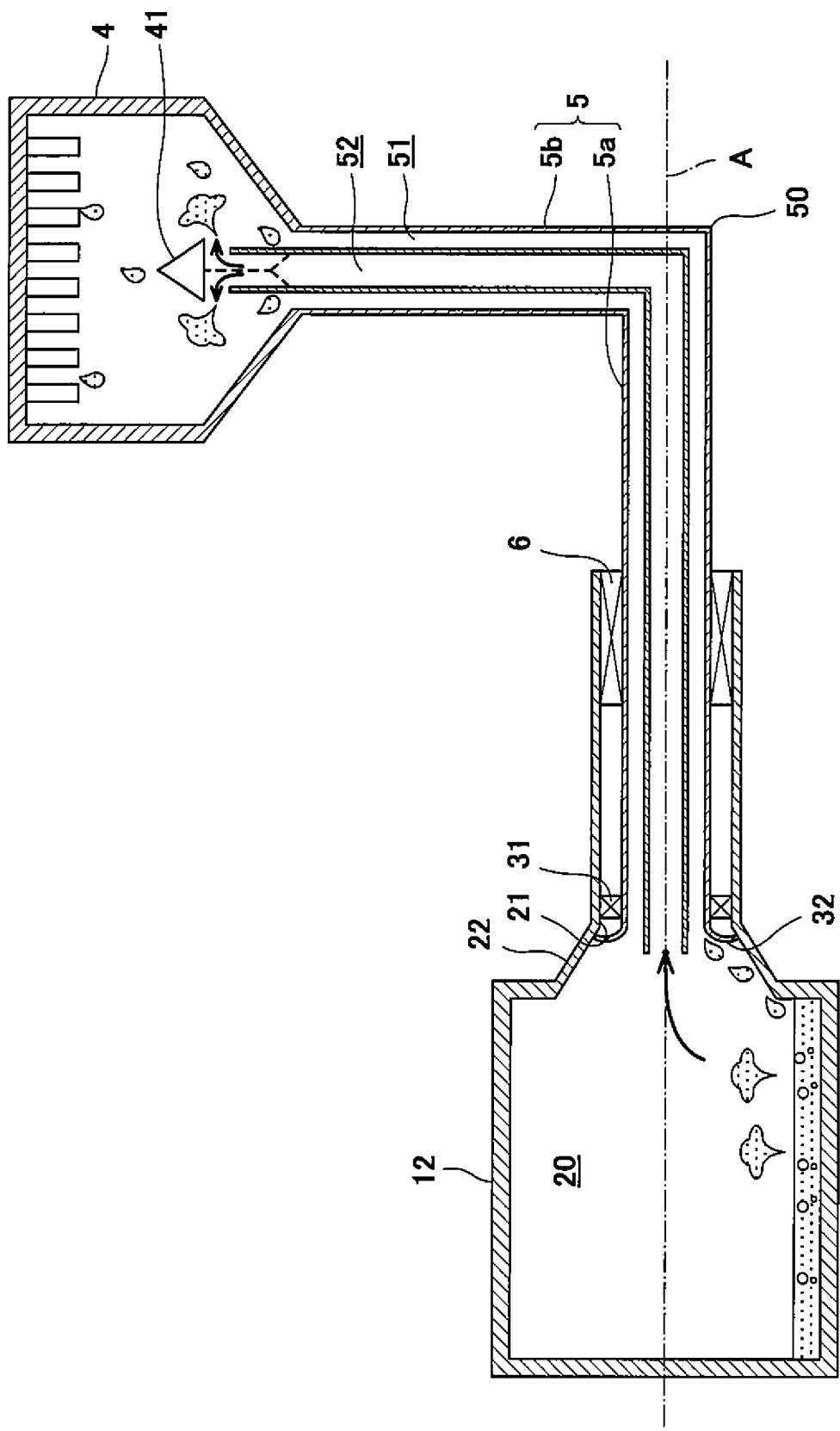
FIG. 3 is a schematic view showing an example of the thermosiphon cooling system used in the rotary machine of FIG. 1.

To prevent the ingress of the liquid phase cooling medium into the gap formed between the opening 21 and the coupling pipe 5, as shown in FIG. 3, the coupling pipe 5 may include a back flow prevention section 32 provided to prevent the liquid phase cooling medium from flowing back from the inside of the evaporator section 12 into the gap formed between the outer peripheral surface of the coupling pipe 5 and the periphery of the opening 21. FIG. 3 is a schematic view showing a thermosiphon cooling system used in the rotary machine 100 of FIG. 1.

The back flow prevention section 32 may be implemented by a blocking member provided on the outer periphery of the coupling pipe 5 to prevent the liquid phase cooling medium from flowing back from the inside of the cooling medium reservoir section 20 of the evaporator section 12 toward the coupling pipe 5 into the gap formed between the opening 21 and the coupling pipe 5, in a case where the whole of the rotary machine 100 is tilted or shakes. For example, as shown in FIG. 3, this blocking member may be, for example, a turn-back portion formed by turning back the outer peripheral wall of the first end portion of the coupling pipe 5 to prevent the ingress of the liquid phase cooling medium into the gap formed between the coupling pipe 5 and the opening 21.

Figure 4:
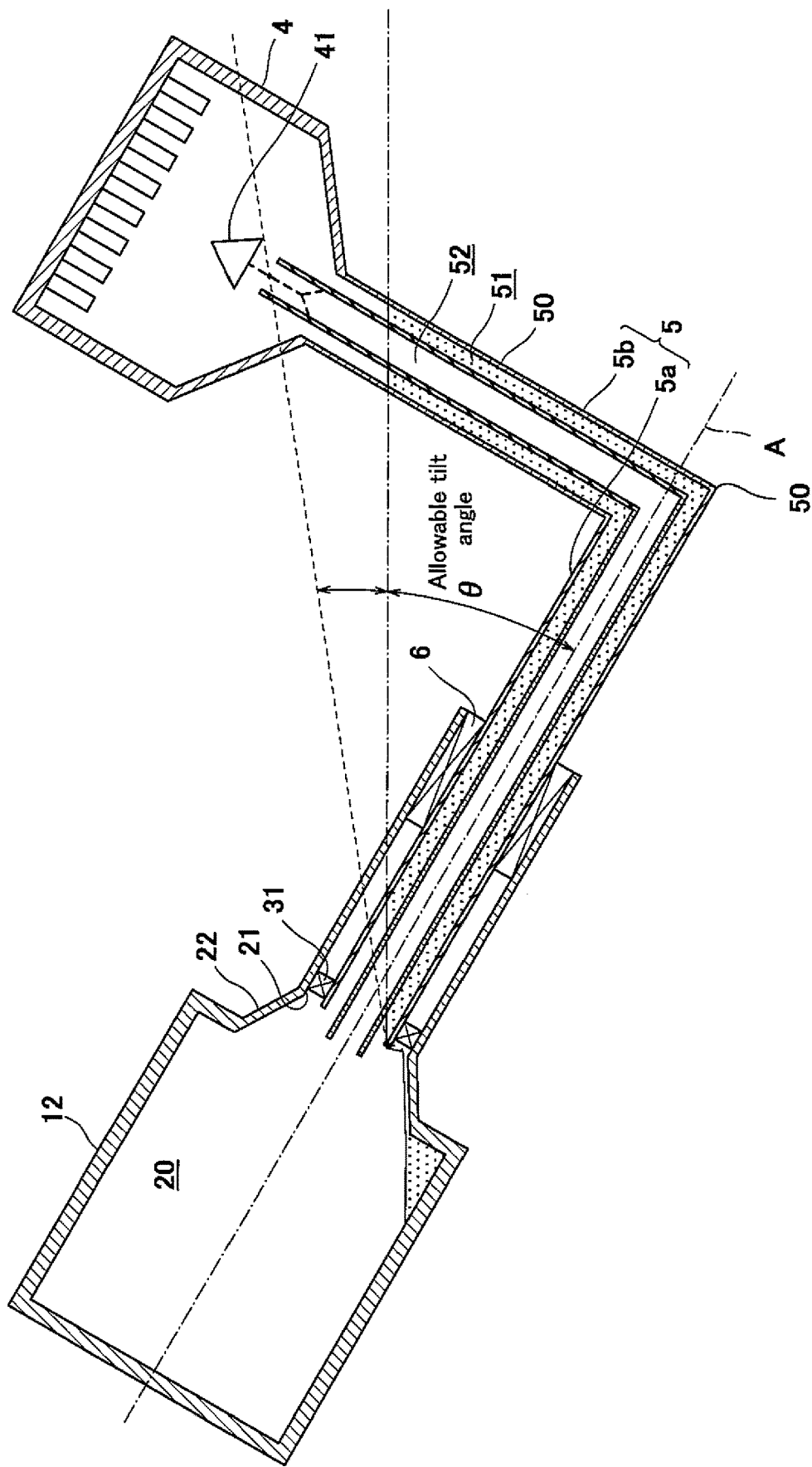
FIG. 4 is a view showing a relation between the length of a coupling pipe portion (a first coupling pipe portion) extending from an evaporator section side to a bent portion and the length of a coupling pipe portion (a second coupling pipe portion) from a condenser section side to the bent portion, in a coupling pipe included in the rotary machine of FIG. 1.

As shown in FIGS. 1 to 3, the outer shape of the coupling pipe 5 is such that the first coupling pipe portion 5a and the second coupling pipe portion 5b form a substantially-L shape. In the coupling member 5 according to the present embodiment, the length of the first coupling pipe portion 5a and the length of the second coupling pipe portion 5b have a relation shown in FIG. 4. FIG. 4 is a view showing a relation between a coupling pipe portion (the first coupling pipe portion 5a) extending from the evaporator section 12 side to the bent portion 50 and a coupling pipe portion (the second coupling pipe portion 5b) extending from the condenser section 4 side to the bent portion 50, in the coupling pipe 5 included in the rotary machine 100 of FIG. 1.

Specifically, a ratio between the length of the first coupling pipe portion 5a and the length of the second coupling pipe portion 5b is set so that an angle formed between the rotational axis A and a line segment connecting the first end portion of the coupling pipe 5 which is closer to the evaporator section 12 (on the evaporator section 12 side) to the second end portion of the coupling pipe 5 which is closer to the condenser section 4 (on the condenser section 4 side) is equal to or larger than an allowable (permissible) tilt (inclination) angle $\theta$ set in the rotary machine 100.

For example, in a case where the whole of the rotary machine 100 is tilted, the coupling pipe 5 is tilted correspondingly, and the first end portion of the coupling pipe 5 which is closer to the evaporator section 12 sometimes becomes higher than the bent portion 50, in a region between the evaporator section 12 and the bent portion 50. In this case, the liquid phase cooling medium does not flow through the coupling pipe 5, from the bent portion 50 toward the evaporator section 12.

However, as described above, in the rotary machine 100, the angle formed between the rotational axis A and the line segment connecting the first end portion of the coupling pipe 5 to the second end portion of the coupling pipe 5 is equal to or larger than the allowable tilt angle $\theta$. Therefore, even when the whole of the rotary machine 100 is tilted to the allowable tilt angle $\theta$, the second end portion of the coupling pipe 5 which is closer to the condenser section 4 can be kept at a level that is equal to or higher than the level of the first end portion of the coupling pipe 5 which is closer to the evaporator section 12. Therefore, for example, in a case where the whole of the rotary machine 100 is tilted or shakes and the liquid phase cooling medium is not supplied to the evaporator section 12 for some time through the coupling pipe 5, the liquid phase cooling medium can be pushed into the cooling medium reservoir section 20 due to a head pressure (hydraulic head pressure) in a state in which the liquid phase cooling medium is reserved in the second coupling pipe portion 5b at a level that is equal to or higher than the level of the first end portion of the coupling pipe 5 which is closer to the evaporator section 12. The allowable tilt angle $\theta$ is defined as an angle to which the rotary machine 100 is allowed (permitted) to be tilted in a place where the rotary machine 100 is disposed. The allowable tilt angle $\theta$ may be set to, for example, a value in a range of 15 degrees to 30 degrees.

Therefore, even in a case where the whole of the rotary machine 100 is tilted or shakes, the liquid phase cooling medium can be supplied to the evaporator section 12. In this way, the capability of cooling the superconducting coils 11 inside the rotor 1 can be maintained.

Further, in the rotary machine 100 according to the present embodiment, at least a portion of the inner surface of the wall surface of the cooling medium reservoir section 20 of the evaporator section 12, the wall surface being located on a side where the coupling pipe 5 is inserted into the cooling medium reservoir section 20, is provided with a tapered hood portion 22 formed to be inclined with respect to the rotational axis A. More specifically, as shown in FIGS. 1 and 2, the tapered hood portion 22 has a frustum shape in which the diameter of the tapered hood portion 22 is increased from the opening 21 toward the center of the rotor 1.

To flow the cooling medium with a sufficient flow rate (sufficient volume) to cool the superconducting coils 11, it is necessary to increase the pipe diameter of the coupling pipe 5 as the pipe length of the coupling pipe 5 is increased. As a result, the diameter of the rotary shaft 3 and the diameter of the bearing supporting the rotary shaft 3 are increased. For this reason, cost of materials and assembling is increased, and maintenance of the bearing is performed more frequently. However, in the rotary machine 100 according to the present embodiment, the evaporator section 12 is provided with the tapered hood portion 22 extending from the evaporator section 12 side toward the coupling pipe 5. In this structure, the pipe length of the coupling pipe 5 can be set shorter than that of the coupling pipe 5 in a case where the evaporator section 12 is not provided with the tapered hood portion 22. This makes it possible to prevent an increase in the pipe diameter of the coupling pipe 5, and prevent an increase in cost of the materials and assembling, or an increase in the number of times of maintenance to be performed, due to the increase in the diameter of the rotary shaft 3 and the diameter of the bearing supporting the rotary shaft 3. In the rotary machine 100 according to the present embodiment, the tilt (inclination) angle of the tapered hood portion 22 with respect to the rotational axis A is set larger than the allowable tilt angle $\theta$.

In the above-described configuration, for example, even in a case where the rotary machine 100 is tilted to the allowable tilt angle $\theta$ and thereby the position of the first end portion of the coupling pipe 5 which is closer to the evaporator section 12 becomes higher than that of the bent portion 50, tilt of the tapered hood portion 22 can be maintained so that it becomes lower from the opening 21 toward the inside of the cooling medium reservoir section 20. Therefore, the liquid phase cooling medium having flowed through the coupling pipe 5 can flow into the cooling medium reservoir section 20 of the evaporator section 12. In addition, it becomes possible to prevent a situation in which the liquid phase cooling medium reserved in the cooling medium reservoir section 20 flows back toward the coupling pipe 5, or the liquid phase cooling medium flows into the gap formed between the periphery of the opening 21 and the coupling pipe 5.

Although in the rotary machine 100 according to the present embodiment, the cooling medium reservoir section 20 of the evaporator section 12 is provided with the tapered hood portion 22, the cooling medium reservoir section 20 may not be provided with the tapered hood portion 22. For example, in a case where the pipe diameter of the coupling pipe 5 falls into a desired dimension range and the liquid phase cooling medium reserved in the cooling medium reservoir section 20 does not flow back toward the coupling pipe 5, the tapered hood portion 22 may be omitted. In a case where the tapered hood portion 22 is omitted, the wall surface of the cooling medium reservoir section 20 which is located on a side where the coupling pipe 5 is inserted into the cooling medium reservoir section 20 is not tilted (inclined) with respect to the rotational axis A.

The configuration in which the cooling medium reservoir section 20 is provided with the tapered hood portion 22 is not limited to the configuration in which the cooling target (target to be cooled) is cooled by utilizing the thermosiphon action. The structure of the coupling pipe 5 is not limited to the above-described double-pipe structure or parallel pipe structure. Specifically, the tapered hood portion 22 may be provided in a machine capable of preventing the back flow of the reserved liquid phase cooling medium, when the whole of the machine is tilted or shakes, in the configuration in which the liquid phase cooling medium used to cool the cooling target is reserved in the cooling medium reservoir section 20. Furthermore, the tapered hood portion 22 may be provided in a machine capable of realizing a structure in which the pipe length of the coupling pipe 5 can be reduced and the diameter of the coupling pipe 5 can be set within a desired pipe diameter range.

Alternatively, the coupling pipe 5 may have a structure for allowing a heat pipe action (wick) to occur.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

INDUSTRIAL APPLICABILITY

The present invention is useful as, for example, a rotary machine which is used in a marine vessel or the like, where the rotary machine is likely to be tilted or shake, and configured to cool a cooling target (target to be cooled) by utilize a thermosiphon action.

REFERENCE SIGNS LIST 1 rotor
3 rotary shaft
4 condenser section
5 coupling pipe
11 superconducting coil
12 evaporator section
13 cooling medium flow pipe
20 cooling medium reservoir section
21 opening
22 tapered hood portion
31 support section
32 back flow prevention section
41 ingress prevention section
50 bent portion
51 liquid phase cooling medium passage
52 gas phase cooling medium passage
60 cooling device
100 rotary machine
A rotational axis
$\theta$ allowable tilt angle

The invention claimed is:

1. A rotary machine which cools a cooling target inside a rotor which is rotatable around a rotational axis, by a thermosiphon action, the rotary machine comprising:
   a condenser section which is disposed outside the rotor and condenses a gas phase cooling medium into a liquid phase cooling medium;
   an evaporator section which is disposed inside the rotor, and evaporates the liquid phase cooling medium generated by condensation in the condenser section into the gas phase cooling medium, by heat exchange between the cooling target and the liquid phase cooling medium; and
   a coupling pipe which flows therethrough the liquid phase cooling medium and the gas phase cooling medium between the evaporator section and the condenser section, and has a bent portion,
   wherein the coupling pipe includes: a liquid phase cooling medium passage which flows therethrough the liquid phase cooling medium by utilizing a gravitational force, the liquid phase cooling medium being generated by the condensation in the condenser section and a gas phase cooling medium passage which flows therethrough the gas phase cooling medium generated by evaporation in the evaporator section, the liquid phase cooling medium passage and the gas phase cooling medium being separately provided,
   wherein the coupling pipe has a double pipe structure in which an inner pipe is the gas phase cooling medium passage, and a space formed between the inner pipe and an outer pipe surrounding an outer periphery of the inner pipe is the liquid phase cooling medium passage, and
   wherein the coupling pipe has a shape in which a first end portion of the coupling pipe is inserted into the evaporator section, the coupling pipe extends from the evaporator section toward an outside region of the rotor along the rotational axis, the coupling pipe is bent at the bent portion, and a second end portion of the coupling pipe is secured to the condenser section.

2. The rotary machine according to claim 1, wherein the coupling pipe has a dimension set so that an angle formed between the rotational axis and a line segment connecting the first end portion and the second end portion to each other is equal to or larger than an allowable tilt angle $\theta$ indicating an angle to which the rotary machine is allowed to be tilted.

3. The rotary machine according to claim 1, wherein inside the evaporator section, a first end portion of the gas phase cooling medium passage, which is closer to the evaporator section, protrudes more than a first end portion of the liquid phase cooling medium passage, which is closer to the evaporator section.

4. The rotary machine according to claim 3, comprising:
an ingress prevention section which is provided inside the condenser section and prevents ingress of the liquid phase cooling medium into the gas phase cooling medium passage.

5. The rotary machine according to claim 1, wherein a second end portion of the coupling pipe is secured to the condenser section, and a first end portion of the coupling pipe is inserted into the evaporator section, wherein the evaporator section has an opening through which the coupling pipe is inserted into the evaporator section, the rotary machine comprising:

a support section which is provided to close a gap formed between an outer peripheral surface of the coupling pipe and a periphery of the opening and supports the coupling pipe at a location which is in the vicinity of the opening.

6. The rotary machine according to claim 1, wherein the evaporator section has an opening through which the coupling pipe is inserted into the evaporator section, the rotary machine comprising:

a back flow prevention section which is included in the coupling pipe and prevents the liquid phase cooling medium from flowing back from an inside of the evaporator section into a gap formed between an outer peripheral surface of the coupling pipe and a periphery of the opening.

7. The rotary machine according to claim 1, wherein the evaporator section has an opening through which the coupling pipe is inserted into the evaporator section, the rotary machine comprising:

a seal section which prevents the liquid phase cooling medium from flowing back from an inside of the evaporator section into a gap formed between an outer peripheral surface of a portion of the coupling pipe which is closer to the evaporator section and a periphery of the opening.

8. The rotary machine according to claim 2, wherein the evaporator section includes:

a cooling medium reservoir section which reserves the liquid phase cooling medium therein; and an opening through which the coupling pipe is inserted into the cooling medium reservoir section, wherein at least a portion of an inner surface of a wall surface of the cooling medium reservoir section, the wall surface being located on a side where the coupling pipe is inserted into cooling medium reservoir section, is provided with a tapered hood portion formed to be tilted with respect to the rotational axis, and the tapered hood portion has the opening in a tip end portion thereof, and wherein a tilt angle of the tapered hood portion with respect to the rotational axis is larger than the allowable tilt angle $\theta$.

9. The rotary machine according to claim 1, wherein the second end portion of the coupling pipe is kept at a level that is equal to or higher than a level of the first end portion of the coupling pipe.

\* \* \* \* \*